June 12, 1934.  R. C. MEANOR ET AL  1,962,454

FOOD CART

Filed Feb. 19, 1932  2 Sheets-Sheet 1

Inventors
Roy C. Meanor
Harry S. Meanor
John E. Meanor
Leon S. Meanor

Jack A. Ashley
Attorney

June 12, 1934.    R. C. MEANOR ET AL    1,962,454
FOOD CART
Filed Feb. 19, 1932    2 Sheets-Sheet 2
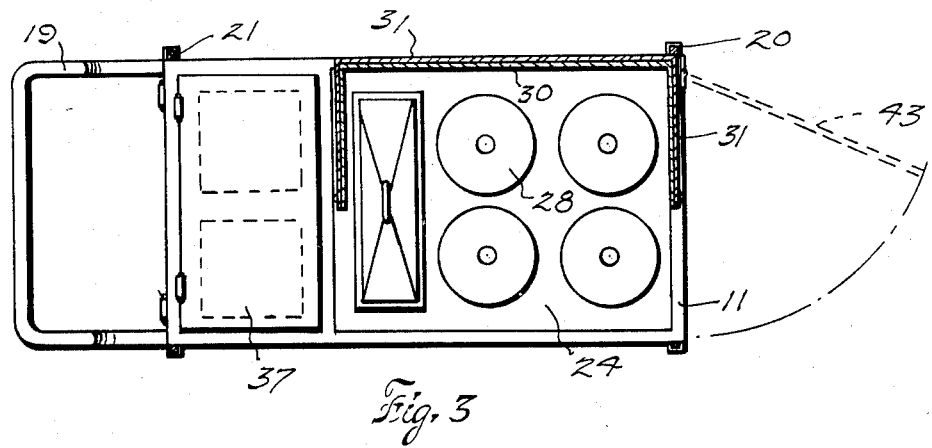
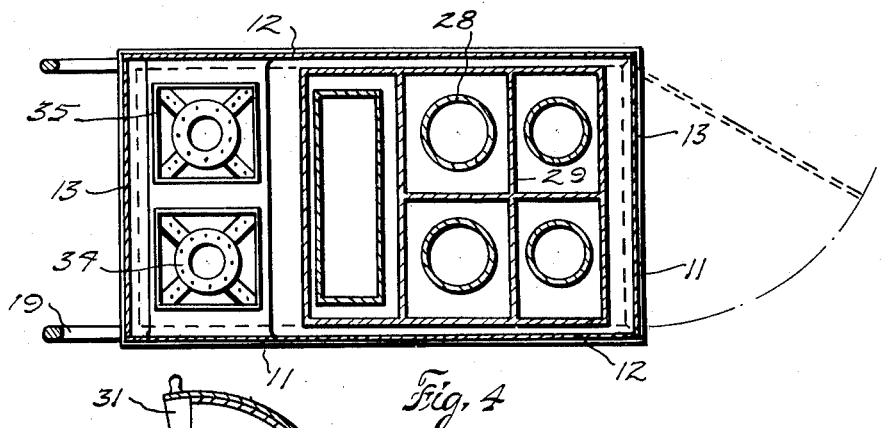
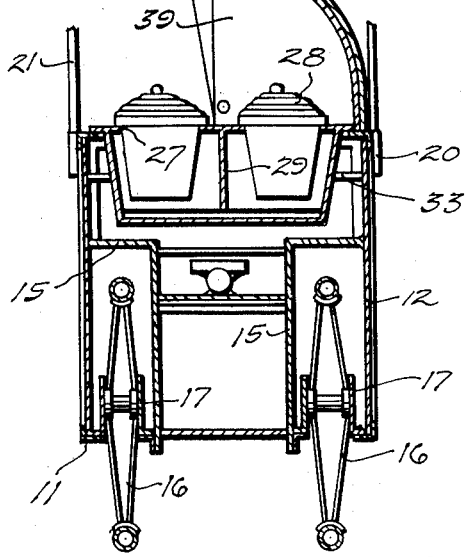
Inventors
Roy C. Meanor
Harry S. Meanor
John E. Meanor
Leon S. Meanor Patented June 12, 1934

1,962,454

UNITED STATES PATENT OFFICE 1,962,454

FOOD CART

Roy C. Meanor, Harry S. Meanor, John E. Meanor, and Leon S. Meanor, Dallas, Tex.

Application February 19, 1932, Serial No. 593,998

1 Claim. (Cl. 126—268)

This invention relates to new and useful improvements in food carts.

One object of the invention is to provide an improved food cart conveniently and compactly arranged for transporting, cooking, dispensing and serving various foods.

Another object of the invention is to provide a steam table for the cart equipped with means for preventing undue splashing of the water in the steam table when the cart is in motion.

A further object of the invention is to provide a cooking grill and cover arranged in a new and novel manner, as well as being positioned in a convenient and accessible part of the structure.

Still another object of the invention is to provide an improved wheel mounting for the cart, whereby the wheels are housed so as not to be contacted by those using the cart, and also whereby a comparatively deep body may be used without making the top too high for convenient use or preventing sufficient road clearance under the body.

A construction designed to carry out the invention will be hereinafter described together with other features of the invention.

Figure 1:
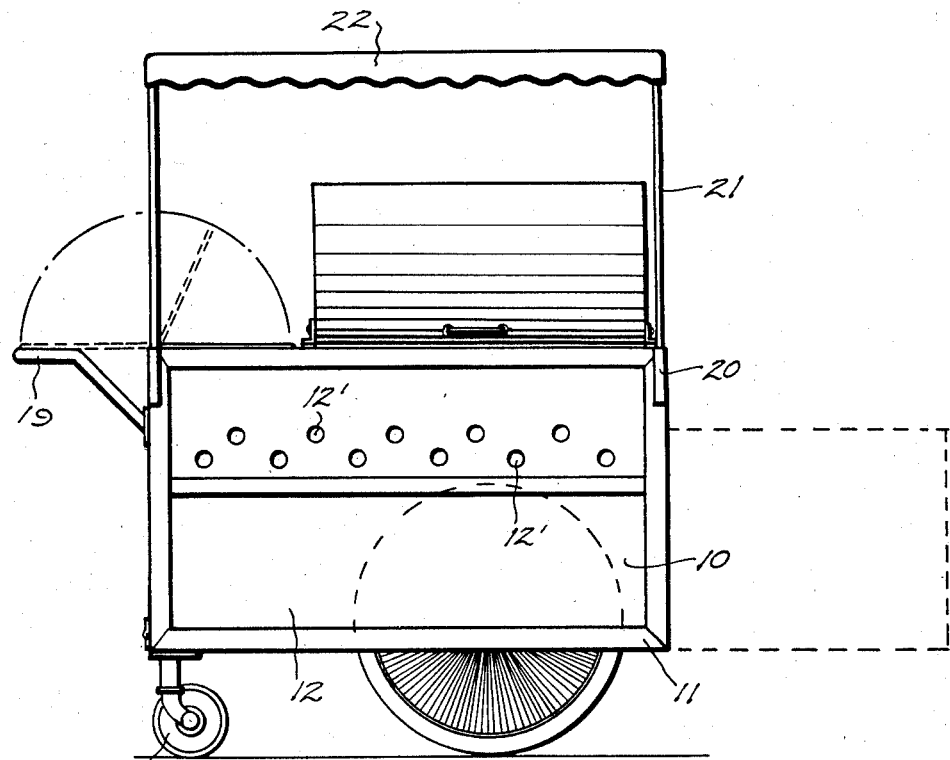
Figure 2:
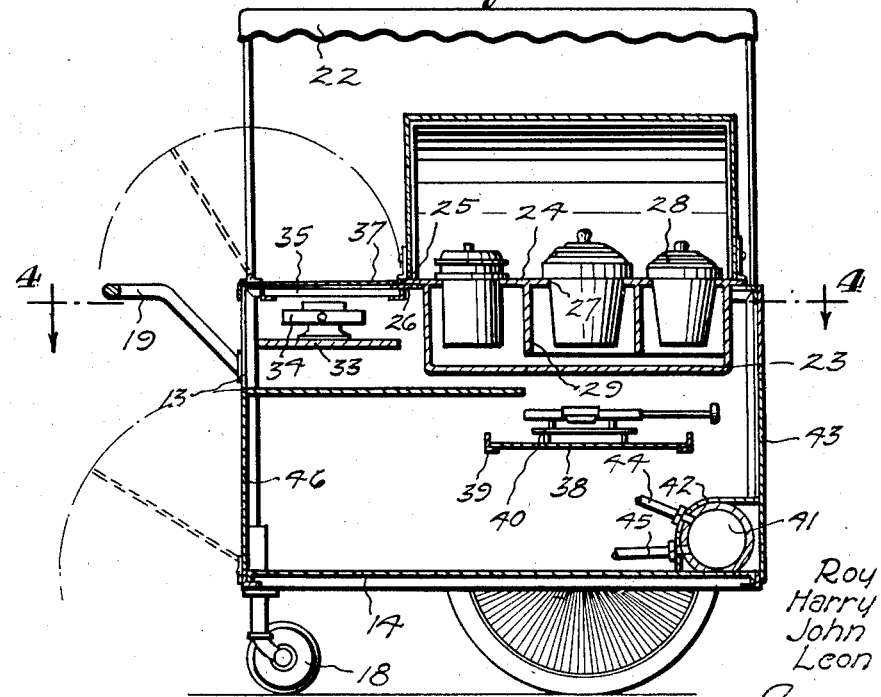

The invention will be more readily understood from a reading of the following specification and by reference to the accompanying drawings in which an example of the invention is shown, and wherein:

Figure 1 is a side elevation of a food cart constructed in accordance with the invention, Figure 2 is a longitudinal vertical sectional view of the same, Figure 3 is a plan view, the hood and the canopy posts being shown in section, Figure 4 is a longitudinal cross-sectional view taken on the line 4—4 of Figure 2, and Figure 5 is a transverse vertical sectional view.

In the drawings the numeral 10 designates a rectangular body, which is composed of an angle iron frame 11 in which side panels 12, end panels 13, and a bottom panel 14, are suitably secured. These panels are preferably of sheet metal. The exterior of the body and the frame may be suitably painted or otherwise ornamented to give a pleasing appearance.

Housings or casings 15 are formed within the body on each side to receive the upper portions of wheels 16 extending through the bottom and mounted in hangers 17 extending upwardly into said housings from the bottom. These wheels are preferably of the bicycle type so as to be light and afford easy transportation. By arranging the wheels within the body the width of the cart is reduced and the operator, as well as the customers, are enabled to come into close proximity with the body without contacting the wheels or soiling their clothing thereby. The housing of the wheels in the body also permits the building of a comparatively deep body without making the top too high for a serving table and with sufficient road clearance under said body.

In order to support the body in a horizontal position, the wheels 16 are placed nearer one end and caster wheels 18 are secured under the opposite end of said body, as is shown in Figures 1 and 2. For convenience, the end at which the casters are disposed will be referred to as the rear end and the opposite end as the front end. U-shaped handle bars 19 are fastened on each side of the rear end of the frame 11 and at the upper portion thereof. In order to protect the top of the cart, sockets 20 are mounted at each corner of the frame 11 and standards 21 are removably inserted in these sockets. The standards carry a canopy 22 at their upper ends which is disposed over the top of the cart.

A steam receptacle 23 is formed with a flat top 24, which is provided with marginal extensions forming flanges 25 which overhang the receptacle. The receptacle is fitted snugly in the top of the frame 11 at one end and is held in place by a cross bar 26. The top plate 24 is formed with eyes 27 for receiving shouldered vessels 28, such as are commonly used in steam tables, and which vessels depend into the receptacle 23. Intersecting partitions 29 depend from the top 24 into the receptacle and terminate close to the bottom of said receptacle. These partitions form compartments into which the vessels depend and the bottoms of which are open so that the water may rise therein. However, the main function of the partitions is to prevent undue splashing of the water when the cart is in motion and this is a very important feature.

A semi-circular hood comprising a stationary section 30 and a closure section 31 is mounted on the top plate 24 of the steam receptacle to cover the vessels 28. The closure section 31 is concentrically hinged on the stationary section 30 so as to swing over the latter, as is shown in Figure 5. By closing the section 31, the vessels are entirely enclosed and are not only protected from dirt and rain and the like, but the heat is conserved. The canopy 22 is arranged some distance above the hood.

Between the rear end panel 13 and the rear end of the steam receptacle, a false bottom 33 is supported near the top of the body and transversely of the same. A pair of fuel burners 34 are secured on this bottom below cooking grills 35 removably supported in the top of the body. A cover plate 37 extending transversely of the body is hinged to the top of the frame 11 along its rear edge. This plate is arranged to cover the grills and form a table on which bread may be sliced or other food handled or wrapped when the burners are not lit. The handle bars 19 are bent so as to form a prop for the plate 37 when the same is swung outwardly, as shown in dotted lines in Figure 1. When the plate is swung outwardly, it forms a shelf which may be utilized for any suitable purpose, such as supporting foods to be cooked before they are placed on the grills or for use as a counter.

For heating the steam table, a plate 38 is seated in angle bars 39 carried by the housings 15 and extending therebetween. A fuel burner 40 is fastened on the plate 38 in proximity to the bottom of the receptacle 23 for heating the water therein to produce steam. A fuel tank 41 for gas or liquid fuel is secured in a holder 42 at the intersection of the bottom 14 and a front door 43. This tank is connected with the burner 40 by a fuel supply pipe 44 and with the burners 34 by a fuel supply pipe 45. The details of this tank are immaterial, as are those of the burners. Such a fuel system is in common use and forms no particular part of the invention.

A rear door 46 is arranged in the rear panel 13 and gives access to the interior of the body which may be utilized as a storage chamber for foods and other articles. The side panels 12 are provided with vents 12' for permitting the escape of excess heat.

It will be seen that by closing the section 31 and swinging the plate 37 over the grills, the cart is entirely closed and the grills and vessels may be kept clean and protected against the weather and extraneous matter. The cart is compact and may be readily transported from place to place. Ample storage space is provided in the body below the bottom 33 and the plate 38. When it is desired to dispense food, the hood section 31 may be swung open, thus giving access to the vessels 28. If food is to be cooked the cover 37 may be swung to its open position and the burners 34 lighted. The cart makes for convenience, efficiency and sanitation.

Various changes in the size and shape of the different parts, as well as modifications and alterations, may be made within the scope of the appended claim.

Having illustrated and described a preferred form of the invention, what is claimed, is:

A cooking and vending cart comprising, a rectangular body having upright unobstructed sides, upright casings within the body, ground wheels housed in the casings, a fuel burner supported between the casings, a steam receptacle suspended in the top of the body and extending over the casings and the burner, said receptacle extending the major portion of the body from front to rear, cooking grills extending across the top of the body in rear of the receptacle, heating means under the grills, a cover hinged to the rear of the top of the body for swinging over the grills, and a handle on the rear of the body serving as a support for the cover when the same is swung rearwardly, the cover and the top of the steam table being substantially flush.

ROY C. MEANOR.
HARRY S. MEANOR.
JOHN E. MEANOR.
LEON S. MEANOR.